United States Patent [19]

Uraneck et al.

[11] 3,998,998

[45] Dec. 21, 1976

[54] NOVEL COPOLYMERS OF DICYANO-SUBSTITUTED 1,3-DIENES

[75] Inventors: Carl A. Uraneck; John E. Burleigh; Raymond L. Cobb, all of Bartlesville, Okla.

[73] Assignee: Phillips Petroleum Company, Bartlesville, Okla.

[22] Filed: Jan. 13, 1975

[21] Appl. No.: 540,570

[52] U.S. Cl. .................. 526/295; 526/84; 526/94; 526/218; 526/300

[51] Int. Cl.² .............. C08F 220/70; C08F 234/00; C08F 222/30; C08F 220/42

[58] Field of Search ............ 260/85.5 A, 85.5 HC, 260/85.5 R, 82.3; 526/300, 295

[56] References Cited

UNITED STATES PATENTS

| | | | |
|---|---|---|---|
| 2,444,882 | 7/1948 | Tawney | 260/465.8 |
| 2,466,395 | 4/1949 | Dickey | 260/85.5 A X |
| 2,480,961 | 9/1949 | Prill | 260/465.8 |
| 2,508,226 | 5/1950 | Clifford et al. | 260/85.5 HC |
| 2,564,102 | 8/1951 | Fawcett et al. | 260/465.8 |
| 2,600,679 | 6/1952 | Park | 260/85.5 HC X |
| 2,615,873 | 10/1952 | Averill | 526/300 |
| 2,628,954 | 2/1953 | Gilbert | 526/300 |
| 2,716,104 | 8/1955 | Gilbert | 526/300 |
| 3,314,910 | 4/1967 | Prem et al. | 260/82.3 X |
| 3,397,252 | 8/1968 | Jones | 260/680 |
| 3,723,500 | 3/1973 | Coulson | 260/82.3 X |

FOREIGN PATENTS OR APPLICATIONS 2,138,857   6/1972   Germany

*Primary Examiner*—Joseph L. Schofer
*Assistant Examiner*—Herbert J. Lilling

[57] ABSTRACT

Novel copolymers are produced by polymerizing 2,3-dicyano-substituted 1,3-dienes with at least one monomer copolymerizable therewith selected from conjugated dienes and vinylaromatic compounds. Some of the copolymeric products are elastomeric while others are thermosetting.

7 Claims, No Drawings

NOVEL COPOLYMERS OF DICYANO-SUBSTITUTED 1,3-DIENES

This invention relates to novel copolymers and processes for preparing same. In accordance with another aspect, this invention relates to novel copolymers having alternating or random structure produced from 2,3-dicyano-substituted 1,3-dienes. In accordance with a further aspect, this invention relates to a process for the production of novel copolymers of alternating or random structures from 2,3-dicyano-substituted 1,3-dienes. In accordance with a further aspect, this invention relates to novel copolymers from 2,3-dicyano-substituted 1,3-dienes and at least one other conjugated diene monomer copolymerizable therewith. In accordance with a further aspect, this invention relates to the production of novel copolymers from 2,3-dicyano-substituted 1,3-dienes and at least one vinylaromatic compound monomer copolymerizable therewith. In accordance with a further aspect, this invention relates to novel copolymers produced from 2,3-dicyano-1,3-butadiene and a copolymerizable monomer. In accordance with a still further aspect, this invention relates to copolymers of alternating structure formed from 2,3-dicyano-1,3-butadiene and either butadiene, isoprene, chloroprene, or styrene.

Accordingly, an object of this invention is to provide novel copolymers of 2,3-dicyano-substituted 1,3-dienes.

Another object of this invention is to provide novel elastomeric copolymers of 2,3-dicyano-substituted 1,3-dienes.

A further object of this invention is to provide novel thermosetting random copolymers of 2,3-dicyano-substituted 1,3-dienes.

Another object of this invention is to provide a process for the production of random copolymers from 2,3-dicyano-substituted 1,3-dienes.

A further object of the invention is to provide a commercially feasible process for the production of alternating or random copolymers from 2,3-dicyano-substituted 1,3-dienes.

Other objects, aspects, and the several advantages of the invention will be apparent to those skilled in the art upon reading the specification and the appended claims.

In accordance with the invention, novel copolymers having alternating or random structure are produced by polymerizing 2,3-dicyano-substituted 1,3-dienes with at least one monomer copolymerizable therewith selected from conjugated dienes and vinylaromatic compounds.

More specifically, novel polymeric compositions comprising copolymers of 1:1 alternating structure of 2,3-dicyano-1,3-dienes are formed by polymerization with at least one comonomer selected from conjugated dienes and carbocyclic vinylaromatic compounds including ring substitution derivatives thereof wherein the substituent is a halogen or hydrocarbyl radical.

Specific novel copolymers having 1:1 alternating structure that have been produced include copolymers of 2,3-dicyano-1,3-butadiene and either butadiene, isoprene, chloroprene, or styrene.

The term "1:1 alternating copolymers" used herein includes copolymers of a structure such that the two component monomers A and B are represented in the polymer in an ABABAB . . . alternating sequence.

The 2,3-dicyano-substituted 1,3-dienes that can be polymerized to the copolymers of the invention are 2,3-dicyamo-1,3-butadienes having the following generic formula

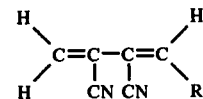

wherein R is one of hydrogen, methyl, ethyl, or n-propyl. These include 2,3-dicyano-1,3-butadiene, 2,3-dicyano-1,3-pentadiene, 2,3-dicyano-1,3-hexadiene, and 2,3-dicyano-1,3-heptadiene. Among these, 2,3-dicyano-1,3-butadiene is preferred.

CONJUGATED DIENE COMONOMERS

Diene comonomers suitable for use in accordance with this invention are conjugated dienes of 4 to 12, and preferably 4 to 8, carbon atoms per molecule. Representative examples of these include 1,3-butadiene, isoprene, piperylene, 2-methyl-1,3-pentadiene, 2,3-dimethyl-1,3-butadiene, 1-phenyl-1,3-butadiene, 1,3-octadiene, 5,6-diethyl-1,3-octadiene, and the like. Among these, butadiene and isoprene are preferred. In addition, conjugated dienes containing halogen and alkoxy substitutents can also be employed, such as chloroprene, 2-fluoro-1,3-butadiene, 2-methoxy-1,3-butadiene, 2-ethoxy-3-ethyl-1,3-butadiene, and 2-ethoxy-3-methyl-1,3-hexadiene.

VINYLAROMATIC COMONOMERS

The vinylaromatic compounds include styrene, 1-vinylnaphthalene, 2-vinylnaphthalene, and the alkyl, cycloalkyl, aryl, alkaryl, and aralkyl derivatives thereof in which the total number of carbon atoms in the combined substituents is generally not greater than 12. Examples of such substituted vinylaromatics include 3-methylstyrene, 4-n-propylstyrene, 4-cyclohexylstyrene, 4-dodecylstyrene, 2-ethyl-4-benzylstyrene, 4-p-tolylstyrene, 4-(4-phenyl-n-butyl)-styrene, 1-vinylnaphthalene, 2-vinylnaphthalene, halostyrenes such as 2,3-dichlorostyrene, and the like. The conjugated dienes and the vinylaromatic compounds can be polymerized alone or in admixture to form the copolymers of the invention.

The weight ratios of the respective comonomer, be it a conjugated diene and/or a vinylaromatic compound, to 2,3-dicyano-1,3-butadiene can range from approximately 90/10 to approximately 10/90. However, on a practical basis, since the resulting copolymers are 1:1 alternating copolymers, it is recommended to normally charge approximately equal molar amounts of comonomer and 2,3-dicyano-1,3-butadiene with preferably a slight excess of the comonomer. The slight excess of comonomer functions to insure the economy of complete conversion of the 2,3-dicyano-1,3-butadiene that has been charged. Any significant excess of one monomer can result in the appearance of a significant amount of the homopolymer of that monomer.

POLYMERIZATION CONDITIONS

Essentially conventional emulsion polymerization conditions known by those skilled in the art can be employed to prepare the inventive polymers. These conditions involve customary dispersion of the mixed monomers in water with the aid of an emulsifying agent such as a soap in the presence of a free radical initiator. As indicated in the specific recipe shown below (under Representative Illustrative Examples), some modifications wer made and are there explained to facilitate the synthesis of the inventive polymers.

The novel copolymers of this invention can also be made under free radical solution polymerization conditions employing such as dichloromethane, benzene, toluene, carbon tetrachloride, or N,N-dimethylformamide as the solvent. Other solvents not inhibitory of the polymerization process can be used. Dichloromethane is preferred for its relatively strong solvent power. Polymerization times and temperatures are selected in accordance with the choice of initiator.

Further, free radical dispersion or suspension polymerization can be employed. Under suspension conditions, the initiator and monomers are dissolved in a solvent of the type indicated above as suitable for solution polymerization, said solution is dispersed in water in the presence of a dispersing agent, to stabilize the suspension, at a polymerization temperature appropriate for the initiator employed.

FREE RADICAL INITIATORS

Although the polymerization reaction can proceed thermally, it is preferable to incorporate into the polymerization system a free radical generating initiator. Initiators useful in the context of this invention include the monomer-soluble organic peroxides and the azo compounds. Examples include di-t-butyl peroxide, benzoyl peroxide, lauroyl perioxide, t-butyl peracetate, t-butyl perbenzoate, dicumyl peroxide, 2,5-dimethyl-2,5-di(t-butylperoxy)hexane, 2,5-dimethyl-2,5-di(t-butylperoxy)hexyne-3, t-butyl hydroperoxide, cumene hydroperoxide, p-menthane hydroperoxide, cyclopentane hydroperoxide, diisopropylbenzene hydroperoxide, pinene hydroperoxide, and the like, and mixtures thereof, as well as any of the azo initiators such as 2,2'-azobis(2-methylpropionitrile), and the like. These compunds can be employed in amounts of the order of 0.01 to 5 phm, with 0.05 to 0.5 phm being preferred.

MOLECULAR WEIGHT MODIFIERS

A variety of organosulfur molecular weight modifiers can be employed. These include the dialkyl xanthogen disulfides, mercaptans, diaryl disulfides, tetraalkyl thiuram disulfides, mercaptothiazoles and the like. These compounds can be employed in amounts of the order of 0.01 to 5 phm organosulfur comound, with 0.05 to 2 phm organosulfur compound being preferred. The dialkyl xanthogen disulfides are the preferred compound type. They range in carbon number from 4 to about 18 and include primary, secondary and tertiary alkyl groups. Examples include dimethyl xanthogen disulfide, diisopropyl xanthogen disulfide, di-t-butyl xanthogen disulfide and di-n-octyl xanthogen disulfide. Mixtures of dialkyl xanthogen disulfides can also be employed. Examples of other organosulfur compounds that can be employed include n-octyl mercaptan, t-dodecyl mercaptan, t-eicosyl mercaptan, sec-octyl mercaptan, cyclododecyl mercaptan, bis(tetrahydrofurfural) xanthogen disulfide, diphenyl disulfide, tetramethyl-thiuram disulfide, 2-mercaptobenzothiazole, and the like. If desired, mixtures of such as a dialkyl xanthogen disulfide and a mercaptan can be employed.

EMULSIFYING AGENTS

Suitable emulsifying agents include rosin acid soaps, disproportionated rosin acid soaps, fatty acid soaps, mixtures of disproportionated rosin acid soaps, with fatty acid soaps, alkaryl sulfonates, and other surface active agents and mixtures thereof. Also nonionic emulsifiers can be employed including polyethers and polyols. The amounts of emulsifying agent employed can range from about 0.5 to about 10 phm.

TERMINATION

At the close of the polymerization or at a desired termination point, the polymerization process is terminated by the addition of a shortstop followed by the addition of an antioxidant. The latex can then be creamed by the addition of dilute aqueous sodium chloride or the like and coagulated by the addition of a dilute mineral acid (e.g., sulfuric). The rubber is then collected by filtration, washed, and dried. Other polymer isolation methods can be employed and are included within the scope of this invention.

UTILITY

The polymers made in accordance with this invention can be compounded with stabilizers, antioxidants, fillers, pigments, reinforcing agents, and such other additives as may be required.

A characteristic advantage, in terms of utility, for the polymers of this invention is their ability to cure thermally, i.e., without addition of curatives. This avoids the possible presence of odor or extractables arising from cure agent residues that would otherwise be present.

The rubbery polymers, e.g., wherein the comonomer is 1,3-butadiene, isoprene, or chloroprene, can be employed in organic solvent resistant applications such as the fabrication of tubing, O-rings, gaskets, surface coatings, calendering, flooring, shoe soles, motor mounts, insulating materials, and the like.

The resinous polymers, e.g., wherein the comonomer is styrene, appears to have utility in applications where impact resistance and/or organic solvent resistance are important. Examples of such applications include plates, cups, medical utensils, and other articles where food resistance, solvent resistance, absence of odor, and extractables are important.

REPRESENTATIVE ILLUSTRATIVE EXAMPLES

Copolymers of 2,3-dicyano-1,3-butadiene were made by emulsion polymerization in accordance with the following recipe:

Recipe

| | phm[1] |
|---|---|
| 2,3-Dicyano-1,3-butadiene | x |
| Comonomer | 100-x |
| Water | 400 |
| Dichloromethane[2] | 234 |
| Sodium lauryl sulfate | 7.5 |
| Acetic acid[3] | 0 or 1 |
| Cumene hydroperoxide | 0.057 |
| $FeSO_4 \cdot 7H_2O$ | 0.005 |
| Versene $Na_4$[4] | 0.033 |
| $HOCH_2SO_2Na \cdot 2H_2O$ | 0.05 |
| Diisopropyl xanthogen disulfide | variable |
| Temperature, ° C | 5 |
| Time | variable |
| Di-t-butylhydroquinone (shortstop) | 0.2 |
| 2,4-Di-t-butyl-4-methylphenol (anti- | |

Recipe-continued

| | phm[1] |
|---|---|
| oxidant) | 0.5 |

[1] Parts by weight per hundred parts monomer.
[2] Dichloromethane was employed to dissolve both monomers and to thereby discourage homopolymerization. Other solvents, of the type indicated above as suitable for solution polymerization, can be employed. The amounts required are dependent upon the effectiveness of the solvent and upon the temperature employed. However, as shown in Example VI, it is possible to operate in the absence of dichloromethane or other mutual solvent if the copolymerization is not carried out to as high a conversion.
[3] The presence of acetic or other carboxylic acid, or mineral acid e.g., hydrochloric, phosphoric, sulfuric, and the like, can be employed in an amount to provide slightly acidic system, thus inhibiting anionic polymerization of 2,3-dicyano-1,3-butadiene.
[4] Tetrasodium ethylenediaminetetraacetate.

EXAMPLE I

A series of runs was made employing the above recipe modified as shown in Table I. Table I also indicates the results obtained.

TABLE I

| Bd/DCBd[1] | 80/20 | 80/20 | 40/20 | 20/20 |
|---|---|---|---|---|
| Acetic acid | — | 1.0 | — | — |
| Time, hr. | 2.7 | 2.7 | 2.7 | 2.7 |
| Conversion, % | 34 | 31 | 55 | 86 |
| Nitrogen, % | 16.9 | 17.1 | 17.7 | 18.3 |
| DCBd, Wt. % | 62.8 | 63.5 | 65.8 | 68.0 |
| Polymer Color | Yellow | White | Yellow | Yellow |

| THEORETICAL VALUES FOR 1:1 COPOLYMER | | | | |
|---|---|---|---|---|
| Conversion, % | 30.4 | 30.4 | 50.8 | 76 |
| Nitrogen, % | 17.71 | 17.71 | 17.71 | 17.71 |
| DCBd, Wt. % | 65.81 | 65.81 | 65.81 | 65.81 |
| Found/Theory[2] | 0.954 | 0.965 | 0.999 | 1.03 |

[1] Weight ratio 1,3-butadiene/2,3-dicyano-1,3-butadiene.
[2] Quotient: Nitrogen % found/nitrogen % theoretical for a 1:1 copolymer.

It is seen, from the above data, that the polymerization preferentially yields the 1:1 copolymer of 1,3-butadiene and 2,3-dicyano-1,3-butadiene although the monomer charge ratio is substantially varied. Also, holding the 2,3-dicyano-1,3-butadiene level constant, conversion to the 1:1 alternating copolymer was increased as the monomer charge approached 1:1.

EXAMPLE II

Table II below shows, with reference to the theoretical values cited in Table I for the 1:1 copolymer, that the copolymer composition remains essentially 1:1 over a substantial range of conversion values. The above recipe was again followed and an 80/20 weight ratio of 1,3-butadiene to 2,3-dicyano-1,3-butadiene was employed.

TABLE II

| Polymerization Time, Hr. | Conversion, % | N, % | DCBd, Wt. % |
|---|---|---|---|
| 0.3 | 22 | 17.35 | 64.5 |
| 0.6 | 26.5 | 17.99 | 66.7 |
| 0.75 | 29 | 17.1 | 63.5 |

EXAMPLE III

Copolymerizations employing the above emulsion recipe were carried out with isoprene, chloroprene, and styrene, as indicated in Table III.

TABLE III

| Monomer | Styrene | Isoprene | Chloroprene |
|---|---|---|---|
| Parts | 60 | 50 | 50 |
| DCBd, parts | 40 | 50 | 50 |
| Dixie[a], parts | 2.0 | 2.5 | 2.5 |
| Temperature, °C | 5 | 5 | 5 |
| Time, Hr. | 1.5 | 1.7 | 1.7 |
| Conversion, % | 67 | 63 | 70.5 |
| Polymer Analyses | | | |
| Nitrogen, % | 15.0 | 15.8 | 15.2[b] |
| DCBd, Wt. % | 55.9 | 58.8 | 56.8 |
| Found/Theory[c] | 1.11 | 0.97 | 1.04 |

[a] Diisopropyl xanthogen disulfide.
[b] Contained 16.1% chlorine.
[c] DCBd for a 1:1 copolymer.

These data indicate that styrene, isoprene, and chloroprene — like 1,3-butadiene — form 1:1 copolymers with dicyanobutadiene.

EXAMPLE IV

Approximately 100-g sample of two copolymers was prepared in accordance with the above emulsion recipe. Polymerization and characterization data are listed in Table IV.

TABLE IV

| Comonomer | Butadiene | Styrene |
|---|---|---|
| Charge Ratio[a], | | |
| (By Weight) | 80/20 | 60/40 |
| Dixie, phm | 1.0 | 2.0 |
| Time, Hr. | 0.75 | 1.5 |
| Temperature, °C | 5 | 5 |
| Conversion, % | 29 | 67 |
| Nitrogen, % | 17.1 | 15.0 |
| Bound DCBd, Wt. % | 63.5 | 55.9 |
| Found/Theory[b] | 0.965 | 1.11 |
| $\eta_{tah}$/gel, % | 0.79/15 | c |

[a] Comonomer/2,3-dicyanobutadiene.
[b] DCBd found/theoretical bound DCBd for 1:1 copolymer.
[c] Insoluble in THF, soluble in dichloromethane.

The 1,3-butadiene/2,3-dicyano-1,3-butadiene copolymer could not be mixed with carbon black on a standard mill without scorching. Solution compounding of the pigment and copolymer was carried out by, first, mixing N330 carbon black or HiSiL (see footnote a, Table V) in 100 ml dichloromethane in an ultrasonic bath coupled to a magnetic stirrer. A dichloromethane solution of copolymer was added to this dispersion and the resulting mixture was vigorously agitated in a Waring Blendor. The solvent was then evaporated from the blend at room temperature. The physical properties measured were compared to Paracril D (a butadiene/acrylonitrile 52/48 copolymer). Comparative physical property data and organic solvent swell data are provided in Table V.

TABLE V

| | 1,3-Butadiene/2,3-dicyano-1,3-butadiene | | | | Paracril D | |
|---|---|---|---|---|---|---|
| Hi-Sil[a], phr[b] | 50[c] | 50[c] | — | — | 50[d] | — |
| N330, phr | — | — | 50[c] | 50[c] | — | 50[d] |
| Cure Temp., °C | 137.8 | 187.2 | 115.6 | 154.4 | 153 | 153 |
| Cure Time, min. | 30 | 30 | 30 | 30 | 30 | 30 |
| Tensile, psi[f] | 1880 | 1790 | 2240 | 3010 | 2150 | 4050 |
| Elongation, %[f] | 330 | 280 | 450 | 200 | 590 | 450 |

TABLE V-continued

| | 1,3-Butadiene/2,3-dicyano-1,3-butadiene | | | | Paracril D | |
|---|---|---|---|---|---|---|
| | Swell after 70 hrs. at 100° C, % | | | | | |
| ASTM Oil No. 3 | 6.1 | —[e] | 6.6 | 4.5 | 9.4 | 11.3 |
| | Swell after 7 days at 25° C, % | | | | | |
| Toluene | 107 | — | 110 | 88 | 94 | 81 |
| Acetone | 332 | — | 412 | 203 | 319 | 211 |
| Trichloro-ethylene | 86 | — | 88 | 75 | 120 | 104 |
| n-Heptane | 1 | — | −0.4 | 0.2 | 4.8 | 1.7 |

[a]Hi-Sil EP, Pittsburgh Plate Glass; a precipitated, fine particle silica of 40 millimicron average particle size and 60 m³/g nitrogen surface area.
[b]Parts by weight per hundred parts by weight of polymer.
[c]No other additive in formulation.
[d]Recipe, phr: zinc oxide, 5; stearic acid, 2; sulfur, 1.75; Santocure, 0.6. (Santocure is N-cyclohexyl-2-benzothiazolesulfenamide.)
[e]Dash denotes no determination was made.
[f]ASTM D 412-66.

The 2,3-dicyano-1,3-butadiene/1,3-butadiene-pigment mixture contained no other compounding additive; whereas the Paracril D was compounded as a typical mechanical goods stock. This property of curing without agents near conventional vulcanization temperatures is attractive as discussed above. Good resistance to solvent swell is exhibited by the above data.

TABLE VI

| Polymer | S-DCB | Tyril 780[a] |
|---|---|---|
| Melt Index, 200° C, 5 kg | no flow | 1.0 |
| Flex. modulus, psi x 10⁻³ | 485 | 566 |
| Mold temperature, ° C | 204 | 177 |
| Tensile break, psi | 8,560 | 10,130 |
| Elongation, % | 7 | 4 |
| Shore hardness[d] | 88 | — |
| Softening Temp., ° C | 88[b] | 86[c] |

[a]70/30 styrene/acrylonitrile copolymer.
[b]Vicat softening point, ASTM D 1525-58T.
[c]Heat distortion temperature, ASTM D648.
[d]ASTM D 2240-68.

the test strips were essentially insoluble after removal from the mold.

EXAMPLE V

Solution Polymerization

A copolymer of 2,3-dicyano-1,3-butadiene and 1,3-butadiene was synthesized under solution polymerization conditions in accordance with the following recipe.

Recipe

| | phm |
|---|---|
| 1,3-Butadiene | 34 |
| 2,3-dicyano-1,3-butadiene | 66 |
| Dichloromethane | 1200 |
| 2,2'-azobis(2-methyl-propionitrile) | 0.5 |
| Di-t-butylhydroquinone (shortstop) | 0.2 |
| 2,6-di-t-butyl-4-methyl-phenol (antioxidant) | 0.5 |
| Polymerization temp., ° C | 50 |
| Polymerization time, hrs. | 5.75 |

A capped, nitrogen-flushed beverage bottle was charged with dichloromethane (149 g) and 2,3-dicyano-1,3-butadiene (17.6 g). The mixture formed a solution upon standing at room temperature. The solution was filtered under nitrogen to remove a trace of polymer. A solution of 2,2'-azobis(2-methylpropionitrile) (0.125 g) in dichloromethane (25 ml) was prepared and combined with the 2,3-dicyano-1,3-butadiene solution along with additional dichloromethane (37 ml). 1,3-Butadiene (3.4 g) was added to the above combination and this polymerization mixture was tumbled in a constant temperature bath at 50° C for 5.75 hours followed by the addition of the shortstop, di-t-butylhydroquinone. Then 0.5 ml of a 10 weight percent solution of 2,6-di-t-butyl-4-methylphenol in isopropyl alcohol and 0.5 ml dichloromethane were added. The polymer was precipitated by adding the above mixture to 300 ml of isopropyl alcohol containing 3 ml of a 10 weight percent solution of 2,6-di-t-butyl-4-methylphenol in isopropyl alcohol. The polymer was collected by filtration and dried at 60° C at reduced pressure. The 2.9 g polymer yield indicated a 29% conversion. The nitrogen content of the polymer, 18.10%, as compared to the calculated value for a 1:1 polymer, 17.7%, indicated that the polymer was effectively of 1:1 composition.

EXAMPLE VI

Emulsion Polymerization in the Absence of a Mutual Solvent

A copolymer of 2,3-dicyano-1,3-dicyano-1,3-butadiene and styrene was synthesized under emulsion polymerization conditions in accordance with the following recipe.

Recipe

| | phm[a] |
|---|---|
| Styrene | 80 |
| 2,3-dicyano-1,3-butadiene | 20 |
| Sodium lauryl sulfate | 7.6 |
| Water | 200 |
| Acetic acid | 0.8 |
| Questex 4SW[b] | 0.064 |
| Ferrous sulfate heptahydrate | 0.01 |
| HOCH₂SO₂Na · 2H₂O | 0.1 |
| Cumene hydroperoxide | 0.116 |
| Diisopropyl xanthogen disulfide | 1.0 |
| Temperature, ° C | 5 |
| Time, hrs. | 2.3 |
| Di-t-butylhydroquinone (shortstop) | 0.2 |
| 2,4-di-t-butyl-4-methyl-phenol (antioxidant) | 0.4 |

[a]Parts by weight per hundred parts by weight monomer.
[b]Tetrahydrate of the tetrasodium salt of ethylenediamine tetraacetic acid.

The polymerization was carried out in capped beverage bottles which were rotated in a constant temperature bath during polymerization. Following addition of shortstop and antioxidant, the polymer was precipitated upon addition of aqueous sodium chloride followed with isopropyl alcohol. The polymer was collected by filtration and, in batches, redissolved in dichloromethane, precipitated in methanol and dried at 60° C under reduced pressure. Conversion based on polymer weight: 27%. Analyses for nitrogen content: approximately 13% (theory, 13.5%) suggestion 1:1 copolymer with possible contamination with polystyrene.

We claim:

1. Copolymers having an alternating structure resulting from the polymerization of a mixture of:

a. from about 10–90 weight percent of a 2,3-dicyano-1,3-diene of the formula

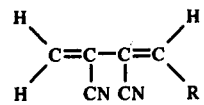

wherein R is one of hydrogen, methyl, ethyl, or n-propyl, and from about 90–10 weight percent of b. at least one conjugated diene having from 4 to 12 carbon atoms, or c. at least one vinylaromatic compound.

2. A composition according to claim 1 which is a rubbery copolymer of 2,3-dicyano-1,3-butadiene and 1,3-butadiene.

3. A composition according to claim 1 which is a rubbery copolymer of 2,3-dicyano-1,3-butadiene and isoprene.

4. A composition according to claim 1 which is a resinous copolymer of 2,3-dicyano-1,3-butadiene and styrene.

5. A composition according to claim 1 which is a rubbery copolymer of 2,3-dicyano-1,3-butadiene and chloroprene.

6. Cured copolymers of claim 1 thermally cured without addition of curatives.

7. Compounded and cured copolymers of claim 1 thermally cured without addition of curatives.

* * * * *